United States Patent [19]

Shoda

[11] Patent Number: 4,949,942

[45] Date of Patent: Aug. 21, 1990

[54] TABLE EXCHANGING DEVICE FOR WOOD WORKING MACHINE

[76] Inventor: Isao Shoda, 116-4, Okaba-cho, Hamamatsu-shi, Shizuoka-ken, Japan

[21] Appl. No.: 435,133

[22] Filed: Nov. 13, 1989

[51] Int. Cl.⁵ .............................................. B23B 7/04
[52] U.S. Cl. ........................................ 269/21; 29/39; 83/451; 83/939; 144/1 A; 409/189; 409/192; 409/219; 409/903
[58] Field of Search ............... 83/451, 939; 269/21; 409/189, 190, 191, 216, 219, 201, 203, 903; 144/1 A, 286 R, 286 A, 150; 29/39

[56] References Cited

U.S. PATENT DOCUMENTS 4,313,478  2/1982  Suzuki ........................ 144/1 A

FOREIGN PATENT DOCUMENTS 60-23122  7/1985  Japan .

Primary Examiner—W. Donald Bray
Attorney, Agent, or Firm—Sughrue, Mion, Zinn, Macpeak & Seas

[57] ABSTRACT

A table exchanging device for a wood working machine wherein workpieces of wood can be individually attracted and fixed by a sucking action by vacuum and such sucking action can be maintained also while the slide tables are slidably moved. The device comprises a pair of hollow slide tables having air sucking holes formed in upper walls thereof, a hollow bracket provided in a pneumatically communicating relationship on each slide table, and a hollow tubular shaft provided on each of a pair of left and right beds of the wood working machine and connected to a blower or a vacuum pump. A first hollow arm is supported for horizontal pivotal motion on each hollow bracket and pneumatically communicated with the follow bracket at their mutually connecting location. A second hollow arm is supported for horizontal pivotal motion on each hollow tubular shaft and pneumatically communicated with the hollow tubular shaft at their mutually connection location. Each first hollow arm is connected to the corresponding second hollow arm by means of a shaft and pneumatically communicated with the second hollow arm at their mutually connecting location.

1 Claim, 7 Drawing Sheets

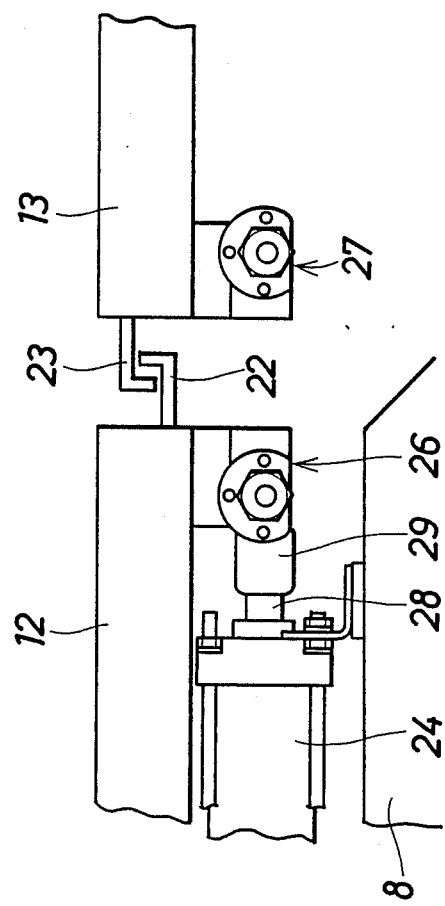

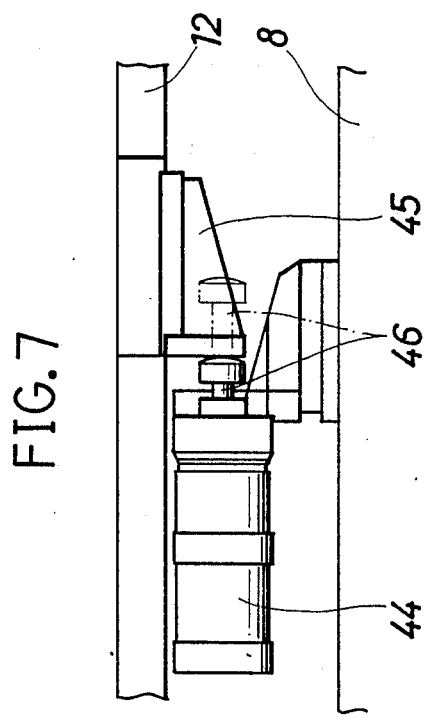
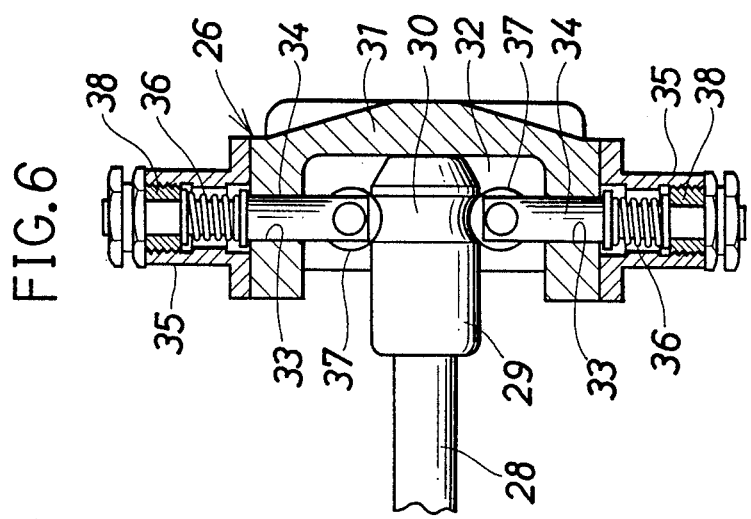

4,949,942

TABLE EXCHANGING DEVICE FOR WOOD WORKING MACHINE

BACKGROUND OF THE INVENTION

1. Field of the Invention

This invention relates to a table exchanging device for alternately exchanging two slide tables to alternatively use one of the two slide tables to improve the operability of a wood working machine of the type which works a workpiece of wood placed on a horizontally movable table.

2. Prior Art

An exemplary one of such table exchanging devices as described above is disclosed, for example, in Japanese Utility Model Publication No. 23122/1985 filed by the inventor of the present patent application. The table exchanging device includes a central bed, a left bed and a right bed disposed at the center and left and right locations of a wood working machine, and a slider mounted for sliding movement in forward and backward directions on the central bed. The table exchanging device further includes a pair of left and right slide tables. The left slide table is adapted to be slidably moved from the left bed to the slider or vice versa while the right slide table is adapted to be slidably moved from the right bed to the slider or vice versa. One of the slide tables which is alternatively slidably transferred to the slider is then fixed to the slider and moved forwardly or backwardly together with the slider on the central bed while the other slide table which is slidably moved to the left or right bed is then fixed to the bed.

With the table exchanging device having such a construction as described just above, one of the slide tables is moved forwardly or backwardly to work a workpiece of wood on the slide table while another workpiece of wood is placed in position on or removed from the other slide table.

On the other hand, U.S. Pat. No. 4,313,478 discloses a wood working router which includes a hollow slide table having a large number of air sucking holes formed in an upper wall thereof so that a workpiece of wood placed on the slide table may be fixed to the slide table by vacuum in the hollow spacing in the slide table connected to a vacuum pump.

SUMMARY OF THE INVENTION

It is an object of the present invention to provide a table exchanging device for a wood working machine wherein workpieces of wood can be individually attracted and fixed by a sucking action by vacuum to two slide tables which can be slidably moved between a central bed and left and right beds and such sucking action by vacuum can be performed without trouble even if the slide tables are slidably moved.

In order to attain the object, according to the present invention, a table exchanging device for a wood working machine comprises a pair of left and right slide tables each having an air chamber formed therein and each having a large number of air sucking holes formed in an upper wall thereof in a communicating relationship to the air chamber, a hollow bracket provided on an end face of each of the slide tables and communicating with the air chamber in the slide table, and a hollow tubular shaft provided on a side face of each of a pair of left and right beds of the wood working machine and connected to a blower or a vacuum pump. A first hollow arm is supported at a base end portion thereof for horizontal pivotal motion on each of the hollow brackets, and the inside of each of the hollow brackets is communicated with the inside of the corresponding first hollow arm at the location at which the first hollow arm is supported for pivotal motion on the hollow bracket. Meanwhile, a second hollow arm is supported at a base end portion thereof for horizontal pivotal motion on each of the hollow tubular shafts, and the inside of each of the hollow tubular shafts is communicated with the inside of the corresponding second hollow arm at the location at which the second hollow arm is supported for pivotal motion on the hollow tubular shaft. Further, a free end portion of each of the first hollow arms is connected to a free end portion of the corresponding second hollow arm by means of a shaft, and the inside of each of the first hollow arms is communicated with the inside of the corresponding second hollow arm at the location at which the first and second hollow arms are connected to each other.

Accordingly, each of the air chambers in the insides of the left and right slide tables are put into a negative pressure condition by way of the corresponding hollow bracket, first hollow arm, second hollow arm and hollow tubular shaft so that air is sucked into the air chamber by way of the large number of air sucking holes of the slide table thereby to attract and fix a workpiece of wood to the slide table. When the slide tables are slidably moved, the first and second hollow arms are pivoted following the slide tables. Consequently, the air chambers in the slide tables are maintained in a negative pressure condition also during such sliding movement of the slide tables.

BRIEF DESCRIPTION OF THE DRAWINGS

FIG. 5 is an enlarged front elevational view showing a mechanism for operatively connecting the left- and right-hand side slide tables shown in FIG. 3 to each other;

FIG. 6 is an enlarged sectional view of a clutch for grasping a head portion of a piston rod of an air cylinder, which is provided for slidably moving a slide table, to connect the piston rod to the slide table;

FIG. 7 is an enlarged front elevational view of a mechanism for damping and stopping sliding movement of a slide table.

DETAILED DESCRIPTION OF THE PREFERRED EMBODIMENT

Figure 1:
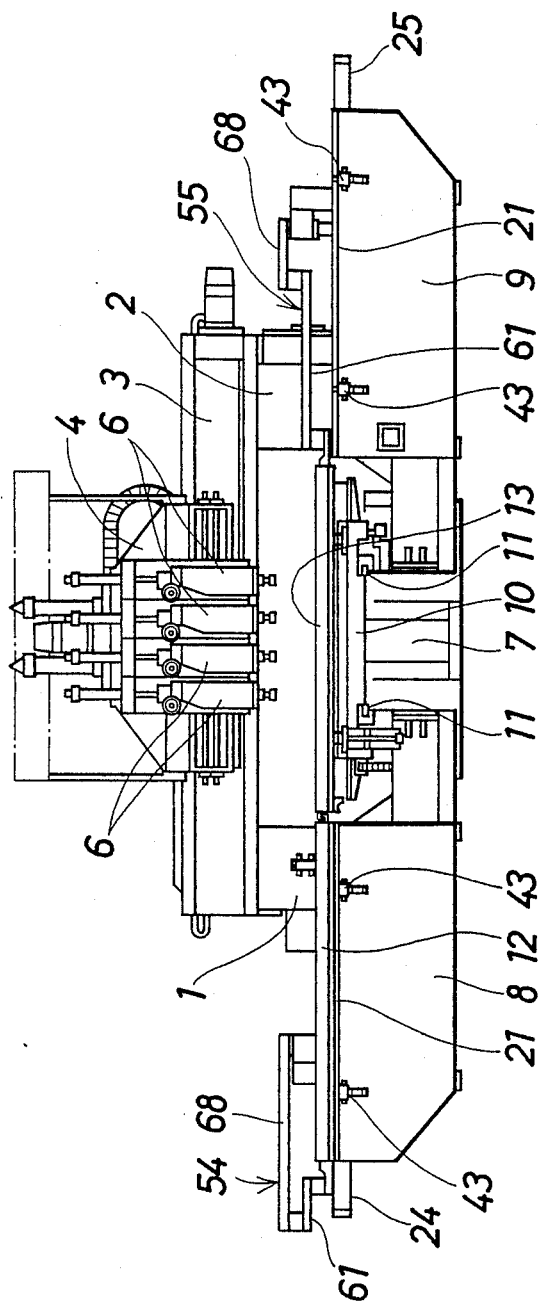
FIG. 1 is a front elevational view of an entire wood working machine which incorporates a table exchanging device according to the present invention.
Figure 2:
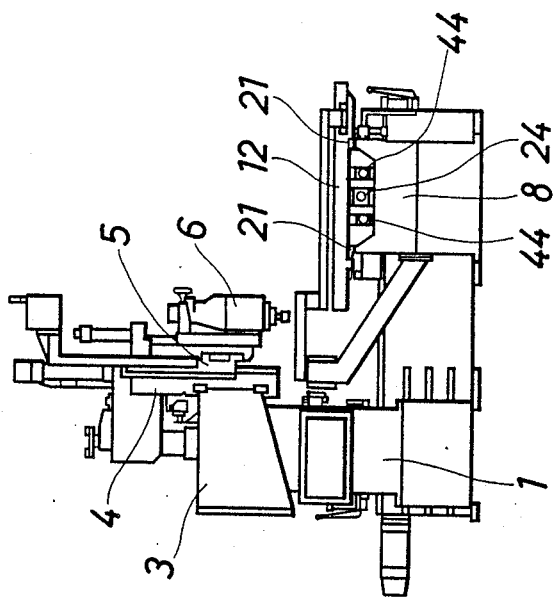
FIG. 2 is a side elevational view of the wood working machine shown in FIG. 1.

An entire wood working machine which incorporates a table exchanging device according to the present invention is shown in FIGS. 1 and 2. Referring to FIGS. 1 and 2, the wood working machine includes a carriage 4 mounted for leftward and rightward sliding movement on a beam 3 which extends horizontally between a pair of left and right columns 1 and 2. A lamb 5 is mounted for upward and downward sliding movement on a front face of the carriage 4, and a plurality of, for example, four, working heads 6 are mounted for individual shifting movement between upper and lower positions on a front face of the lamb 5. One of the working heads 6 to be used is shifted to the lower position, and the carriage 4 is moved leftwardly or rightwardly while the lamb 5 is moved upwardly or downwardly to work a workpiece of wood with the working head 6.

The wood working machine further includes a central bed 7 disposed on the front side between the left and right columns 1 and 2, and a pair of left and right beds 8 and 9 disposed on the left and right sides of the central bed 7. A slider 10 is mounted on the central bed 7 and is slidably moved forwardly or backwardly along a pair of left and right rails 11 on the central bed 7 when a motor not shown provided on the central base 7 is energized.

Figure 3:
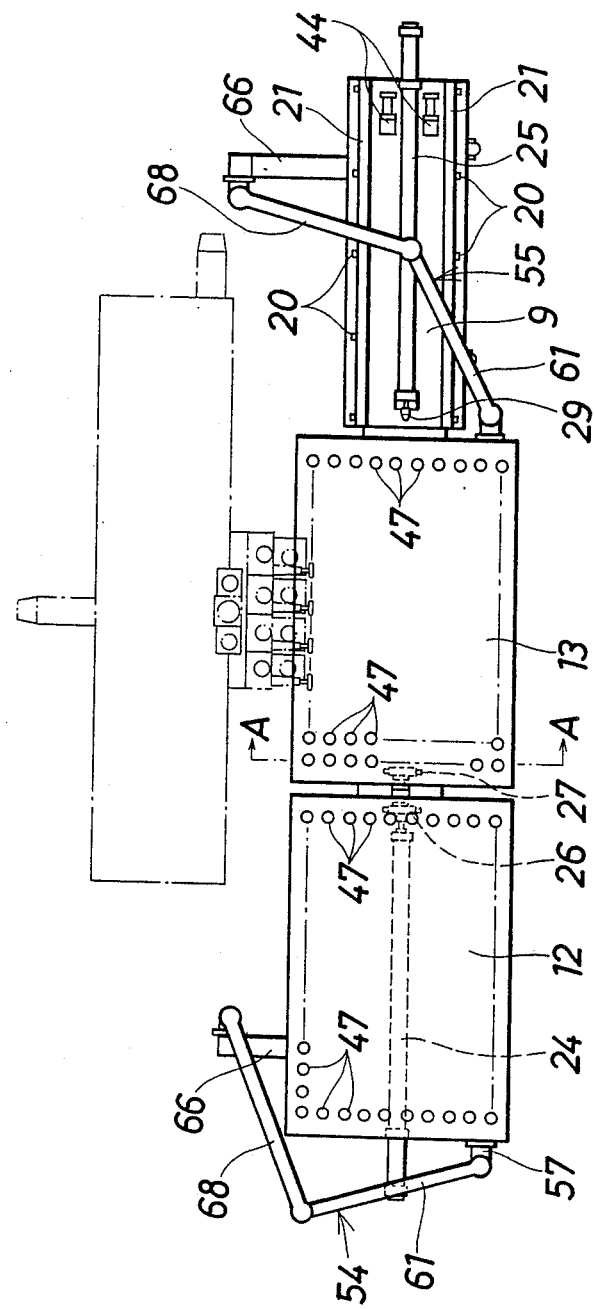
FIG. 3 is a top plan view principally showing the table exchanging device according to the present invention.

The Table exchanging device according to the present invention incorporated in the wood working machine includes a pair of left and right slide tables 12 and 13 having a rectangular configuration of the same size as shown in FIG. 3 such that the slide tables 12 and 13 may be slidably moved between the slider 10 and the left and right beds 8 and 9, respectively, in the following manner.

Figure 4:
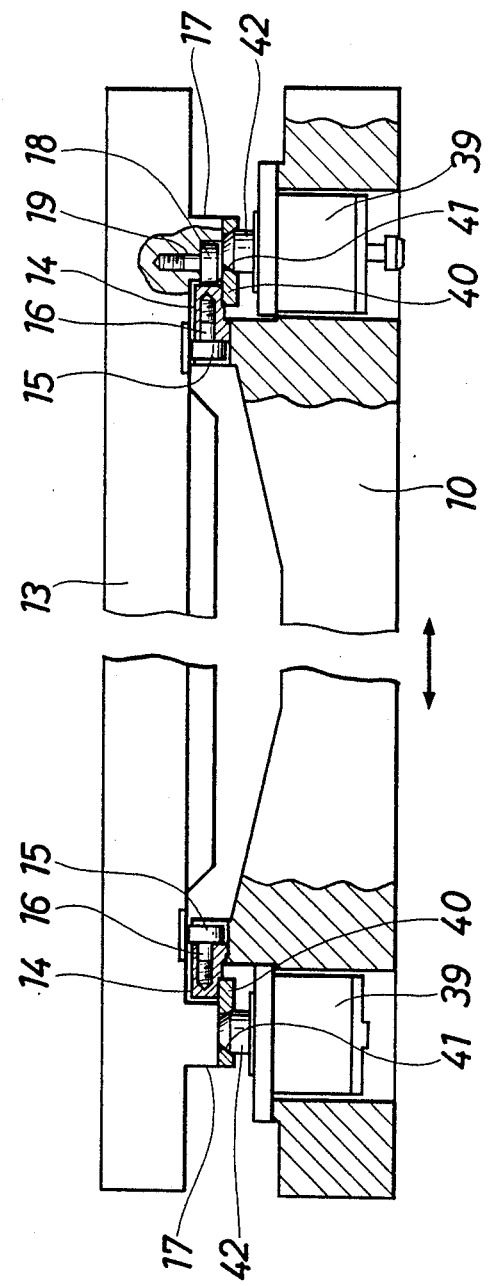
FIG. 4 is an enlarged sectional view taken along line A—A of FIG. 3 showing a right-hand side one of a pair of slide tables and a slider of the table exchanging device of FIG. 3.

In particular, a pair of front and rear rails 14 are provided horizontally on an upper face of the slider 10 as shown in FIG. 4 which is an enlarged sectional view taken along line A—A of FIG. 3, and a plurality of support rollers 15 are supported on each of the rails 14 for individual rotation in a predetermined spaced relationship in the longitudinal direction of the rails 14 each by means of a threaded roller shaft 16. A pair of front and rear projections or ribs 17 are provided in an integral relationship on a lower face of each of the slide tables 12 and 13 such that they may oppose to opposing side faces of the front and rear rails 14, respectively. A plurality of guide rollers 18 are supported for rotation on the front projection 17 of each of the slide tables 12 and 13 each by means of a threaded roller shaft 19 such that they may roll along the front face of the front rail 14. Thus, the left and right slide tables 12 and 13 are supported on the front and rear rollers 15 and can be slidably moved leftwardly and rightwardly along the front and rear rails 14 on the slider 10.

Referring to FIGS. 1 to 3, a pair of front and rear rails 21 are installed horizontally on an upper face of each of the left and right beds 8 and 9 with the same height and in a same spaced relationship with the front and rear rails 14 on the slider 10. When the slider 10 is stopped at a position at which the front and rear rails 14 on the slider 10 and the front and rear rails 21 on the left or right bed 8 or 9 are aligned with each other, respectively, the left side slide table 12 can slidably moved leftwardly and rightwardly along the rails 14 and 21 between the left bed 8 and the slider 10 or the right side slide table 13 can slidably move leftwardly and rightwardly along the rails 14 and 21 between the right bed 9 and the slider 10.

Referring now to FIG. 5, a pair of L-shaped and inverted L-shaped connecting brackets 22 and 23 are provided on opposing end faces of the left and right slide tables 12 and 13 for engaging with each other such that the slide tables 12 and 13 may be moved in an interlocking relationship in a leftward or rightward direction. However, the slide tables 12 and 13 can individually move forwardly or backwardly without interfering with each other because the connecting brackets 22 and 23 are not engaged with each other upon such forward or backward movement of the slide table 12 or 13.

Referring also to FIGS. 1 to 3, a pair of left and right table exchanging air cylinders 24 and 25 are mounted horizontally at intermediate positions between the front and rear rails 21 on the left and right beds 8 and 9 for moving the left and right slide tables 12 and 13 leftwardly or rightwardly, respectively. Meanwhile, a pair of left and right clutches 26 and 27 corresponding to the left and right air cylinders 24 and 25 are mounted on lower faces of opposing end portions of the left and right slide tables 12 and 13, respectively, as shown in FIG. 5.

Referring now to FIG. 6, there is shown, in an enlarged scale, a relationship between the left side clutch 26 and a head portion 29 of a piston rod 28 of the left side air cylinder 24. An arcuately recessed groove 30 is provided on an outer periphery of the head portion 29 of the piston rod 28. Meanwhile, the clutch 26 has a body 31 having a recess 32 formed therein. The recess 32 has a size sufficient to receive the head portion 29 of the piston rod 28 therein. The body 31 of the clutch 26 further has a pair of guide holes 33 formed therein on the opposite sides of the recess 32. A pair of plungers 34 are fitted for sliding movement in and extend radially through the guide holes 34. Each of the plungers 34 is normally urged radially inwardly by a compression coil spring 36 which is accommodated in a box nut 35 mounted on an outer face of the body 31. When the head portion 29 of the piston rod 28 advances axially into the recess 32 of the clutch body 31 as shown in FIG. 6, a pair of rollers 37 supported for rotation at radial inner ends of the plungers 34 are fitted into the groove 30 at the head portion 29 of the piston rod 28 under the resilient forces of the springs 36 so that the plungers 34 cooperate with each other to hold the head portion 29 of the piston rod 29 therebetween to operatively connect the piston rod 28 of the left side air cylinder 24 and the left side slide table 12 to each other. Though not particularly shown, the right side clutch 27 has a substantially similar structure while having a symmetrical configuration so that it can similarly interconnect the piston rod 28 of the right side air cylinder 25 and the right side slide table 13. The holding forces of the head portion 29 of the piston rod 28 by the plungers 34 can be adjusted by adjustment of the resilient forces of the compression coil springs 36 by means of bolts 38 screwed in the box nuts 35.

Now, it is assumed that the left side slide table 12 lies on the left bed 8 while the right side slide table 13 lies on the slider 10 as shown in FIGS. 1 and 3, and the front and rear rails 14 of the slider 10 are held in an aligned condition with the front and rear rails 21 on the left and right beds 8 and 9, respectively, and besides, the piston rods 28 of both of the left and right table exchanging air cylinders 24 and 25 are at their retracted positions. In this condition, if the piston rod 28 of the left side air cylinder 24 is advanced (extended) rightwardly, then the piston rod 28 and the left side clutch 26 are put into such an engaged condition as shown in FIG. 6. Consequently, as the piston rod 28 is further advanced rightwardly, the slide table 12 is slidably moved rightwardly, whereupon it pushes the right side slide table 13 to move rightwardly. Then, when the left side slide table 12 is transferred from the left bed 8 to the slider 10, the right side slide table 13 is simultaneously transferred from the slider 10 to the right bed 9.

When the left side slide table 12 is to be transferred from the slider 10 to the left side slide table 12 and the right side slide table 13 is to be transferred from the right bed 9 to the slider 10, the piston rod 28 of the right table exchanging air cylinder 25 is advanced into similar engagement with the right side clutch 27.

Referring to FIG. 4, a locking air cylinder 39 is embedded at each of the four corners of the slider 10. The locking air cylinders 39 are so positioned that, when the left or right side slide table 12 or 13 is transferred to the slider 10, they are rendered operative to fit piston rods 42 thereof into holes 41 of locking places 40 securely mounted on a lower face of the slide table 12 or 13 thereby to lock the slide table 12 or 13 in position on the slider 10 for integral forward or backward movement.

A plurality of locking air cylinders 43 are also mounted on each of the left and right beds 8 and 9 as shown in FIG. 1, and a pair of hydraulic shock absorbers 44 are mounted on each of the left and right beds 8 and 9 as shown in FIGS. 2 and 3. During transferring movement of the left or right side slide table 12 or 13 from the slider 10, a bracket 45 securely mounted on a lower face of the slide table 12 or 13 as shown in FIG. 7 collides with piston rods 46 of the shock absorbers 44 on the left or right bed 8 or 9, and thereupon, the left or right side slide table 12 or 13 is stopped and positioned at a predetermined position under the shock absorbing action of the hydraulic shock absorbers 44. After then, the left or right side slide table 12 or 13 is locked on the left or right bed 9 by the locking air cylinders 43.

After the piston rod 28 of the left side table exchanging air cylinder 24 has been advanced rightwardly as described above, it is retracted leftwardly after the right side slide table 13 is locked on the right bed 9 by the locking air cylinders 43. In this instance, the connecting brackets 22 and 23 of the left and right slide tables 12 and 13 are engaged with each other so that the left side slide table 12 is connected to the right side slide table 13 which is in such a locked condition as described above. Consequently, the head portion 29 of the piston rod 28 of the left side air cylinder 24 is disengaged from the left side clutch 26. As a result, the left side table 12 is separated from the piston rod 28 of the left side air cylinder 24 and thus remains on the slider 10.

On the other hand, the piston rod 28 of the right side table exchanging air cylinder 25 is retracted and disengaged from the right side clutch 27 after the left side slide table 12 is transferred from the slider 10 to the left bed 8 and locked on the left bed 8.

Referring to FIG. 3, a large number of air sucking holes 47 are formed in an upper wall of each of the left and right slide tables 12 and 13 for attracting a workpiece of wood W (FIG. 8) placed on the slide table 12 or 13 to the slide table 12 or 13. The slide tables 12 and 13 are hollow in the insides thereof. In particular, referring to FIG. 8 in which an end portion of the right side slide table 13 is shown in cross section, the slide table 13 includes a lower plate 49 having a large number of protrusions 48 on an upper face thereof, and an upper plate 50 having a large number of air sucking holes 47 formed therein. The upper plate 50 is placed on and secured to the lower plate 49 so as to define a flattened air chamber 51 between the upper and lower plates 50 and 49. The lower plate 49 has a hollow portion 53 formed on the lower side of a right end portion thereof in a communicating relationship with the air chamber 51 by way of a slit 52 formed in the lower plate 49. The left side slide table 12 has a similar construction to the right side slide table 13 except that the hollow portion 53 is provided at a left end portion of the lower plate 49.

Referring back to FIGS. 1 and 3, a left side expansible joint mechanism 54 is disposed between a left end face of the left side slide table 12 and a rear face of the left head 8 while a right side expansible joint mechanism 55 is disposed between a right end face of the right side slide table 13 and a rear face of the right head 9. The right side joint mechanism 55 is shown in cross section in FIG. 8 and has the following structure.

Figure 8:
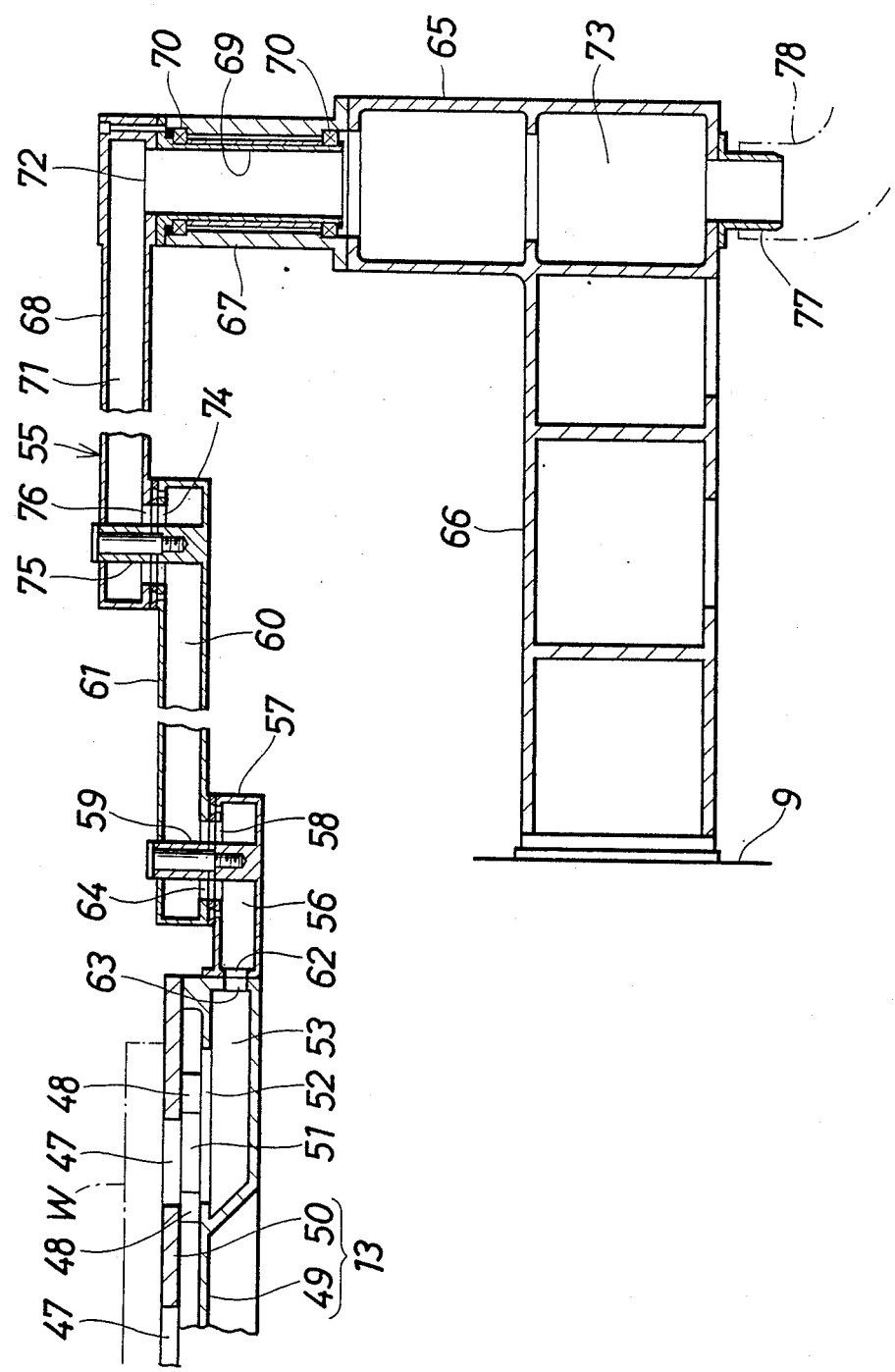
FIG. 8 is an enlarged sectional view of a mechanism for connecting a hollow chamber in a slide table to a blower or a vacuum pump.

Referring particularly to FIG. 8, a hollow bracket 57 in the form of a short angular pipe having an air chamber 56 therein is provided horizontally on the outer face of the hollow portion 53 of the right side slide table 13. The hollow bracket 57 has a communicating hole 58 formed in an upper wall thereof while it has a pivot shaft 59 formed vertically on a lower wall thereof. The pivot shaft 59 extends upwardly through and from the communicating hole 58. A first hollow arm 61 in the form of an angular pipe having an air chamber 60 formed therein is supported at a base end portion thereof for pivotal motion around the upper extension of the pivot shaft 59 so that the arm 61 can be pivoted horizontally with respect to the hollow bracket 57. The air chamber 56 of the hollow bracket 57 is communicated with the hollow portion 53 of the right side slide table 13 by way of communicating holes 62 and 63 formed in the hollow bracket 57 and the right side slide table 13, respectively. Meanwhile, the air chamber 56 of the hollow bracket 57 is communicated with the air chamber 60 of the first hollow arm 61 by way of the communicating hole 58 and another communicating hole 64 which are formed in the hollow bracket 57 and the first hollow arm 61, respectively, and through which the pivot shaft 59 extends.

On the other hand, a bracket 66 is provided horizontally on a rear face of the right bed 9 and has a vertically extending cylindrical portion 65 at an end thereof. A hollow tubular shaft 67 is securely mounted vertically at an upper end of the cylindrical portion 65 of the bracket 66. A collar 69 is provided on a lower face of a base end portion of a second hollow arm 68 in the form of an angular pipe and is fitted for rotation in the hollow tubular shaft 67 so that the second hollow arm 68 can be pivoted horizontally with respect to the hollow tubular shaft 67. The second hollow arm 68 has an air chamber 71 formed therein. The air chamber 71 is communicated with an air chamber 73 of the cylindrical portion 65 of the bracket 66 by way of a communicating hole 72 formed at the base end portion of the second hollow arm 68 and an inner bore of the collar 69.

A communicating hole 74 is formed in an upper wall at a free end portion of the first hollow arm 61 in a similar manner as in the hollow bracket 57, and a pivot shaft 75 is provided vertically on a lower wall at the free end portion of the first hollow arm 61 and extends upwardly through and from the communicating hole 74. The free end portion of the first hollow arm 61 and the free end portion of the second hollow arm 68 are thus connected for pivotal motion to each other by means of the pivot shaft 75. Thus, when the slide table 13 is moved leftwardly or rightwardly, the entire length of the hollow arms 61 and 68 is increased or decreased accordingly. The air chamber 60 of the first hollow arm 61 and the air chamber 71 of the second hollow arm 68 are communicated with each other by way of the communicating hole 74 and another communicating hole 76 formed at the free end portions of the first and second hollow arms 61 and 68, respectively. A nipple 77 is formed at a lower end of the cylindrical portion 65 of the bracket 66, and a blower or a vacuum pump is connected to the nipple 77 by way of a hose 78.

Accordingly, the air chamber 51 of the slide table 13 is connected to the blower or vacuum pump by way of the hollow bracket 57, first hollow arm 61, second hollow arm 68, collar 69 and cylindrical portion 65 all constituting the joint mechanism 55 and further by way of the hose 78 so that the air chamber 51 can be put into a negative pressure or vacuum condition irrespective of expansion or contraction of the first and second hollow arms 61 and 68. The left side joint mechanism 54 has a substantially same structure with the right side joint mechanism 55 but has a substantially symmetrical configuration wherein such various components as described above are assembled individually in the opposite orientations to those in the right side joint mechanism 55. Thus, the air chamber 51 of the left side slide table 12 is put into a vacuum or negative pressure condition by operation of another blower or vacuum pump. In either of the left and right slide tables 12 and 13, when the air chamber 51 is put into a negative pressure condition, air is sucked into the air chamber 51 by way of the large number of air sucking holes 47 so that a workpiece of wood W placed on the slide table 12 or 13 is attracted to the slide table 12 or 13.

The workpiece of wood W is thus attracted to and fixed to an arbitrary position or a predetermined position on the slide table 12 or 13. The slide table 12 or 13 on which the workpiece of wood W is fixed is in turn fixed to the slider 10 and moved forwardly or backwardly together with the slider 10 to work the workpiece of wood W with a selected one of the working heads 6 as described above. In the meantime, either an removing operation of a workpiece of wood after working thereof has been completed or an attracting operation of a new workpiece of wood can be performed on the side of the other slide table 13 or 12.

Having now fully described the invention, it will be apparent to one of ordinary skill in the art that many changes and modifications can be made thereto without departing from the spirit and scope of the invention as set forth herein.

What is claimed is:

1. A table exchanging device for a wood working machine, comprising a pair of left and right slide tables each having an air chamber formed therein and each having a large number of air sucking holes formed in an upper wall thereof in a communicating relationship to said air chamber, a hollow bracket provided on an end face of each of said slide tables and communicating with said air chamber in the slide table, a hollow tubular shaft provided on a side face of each of a pair of left and right beds of said wood working machine and connected to a blower or a vacuum pump, a first hollow arm supported at a base end portion thereof for horizontal pivotal motion on each of the hollow brackets, the inside of each of the hollow brackets being communicated with the inside of the corresponding first hollow arm at the location at which the first hollow arm is supported for pivotal motion on the hollow bracket, a second hollow arm supported at a base end portion thereof for horizontal pivotal motion on each of the hollow tubular shafts, the inside of each of the hollow tubular shafts being communicated with the inside of the corresponding second hollow arm at the location at which the second hollow arm is supported for pivotal motion on the hollow tubular shaft, and a shaft for connecting a free end portion of each of the first hollow arms to a free end portion of the corresponding second hollow arm, the inside of each of the first hollow arms being communicated with the inside of the corresponding second hollow arm at the location at which the first and second hollow arms are connected to each other.

* * * * *